US012705306B2

(12) United States Patent
Groh et al.

(10) Patent No.: US 12,705,306 B2
(45) Date of Patent: Aug. 11, 2026

(54) METHOD AND APPARATUS FOR PROVIDING A DATA-BASED SYSTEM MODEL AND FOR CHECKING A TRAINING STATE OF THE SYSTEM MODEL

(71) Applicant: Robert Bosch GmbH, Stuttgart (DE)

(72) Inventors: Konrad Groh, Stuttgart (DE); Matthias Woehrle, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 870 days.

(21) Appl. No.: 18/154,095

(22) Filed: Jan. 13, 2023

(65) Prior Publication Data

US 2023/0222180 A1 Jul. 13, 2023

(30) Foreign Application Priority Data

Jan. 13, 2022 (DE) ..................... 10 2022 200 285.7

(51) Int. Cl.
*G06F 18/22* (2023.01)
*G06F 18/21* (2023.01)
*G06N 20/00* (2019.01)

(52) U.S. Cl.
CPC .......... *G06F 18/22* (2023.01); *G06F 18/2163* (2023.01); *G06N 20/00* (2019.01)

(58) Field of Classification Search
CPC ...... G06F 18/2163; G06F 18/22; G06N 20/00
See application file for complete search history.

(56) References Cited

U.S. PATENT DOCUMENTS

2023/0059924 A1* 2/2023 Heinrich .................. G06N 3/09
2023/0196193 A1* 6/2023 Knobloch ............... B60R 25/24 706/12

OTHER PUBLICATIONS

Poyiadzi, R. et al., "FACE: feasible and actionable counterfactual explanations," Proc. of the AAAI/ACM Conf. on AI, Ethics, and Society (2020) pp. 244-350. (Year: 2020).*
Cherti, M. et al., "Out-of-class novelty generation: an experimental foundation," Intl. Conf. on Representation Learning (Apr. 2017) 14 pp. (Year: 2017).*

(Continued)

*Primary Examiner* — Brian M Smith
(74) *Attorney, Agent, or Firm* — Maginot, Moore & Beck LLP

(57) ABSTRACT

A method is for providing training data for training a data-based system model for operating a technical system by defining a data point determined from input variables for determining at least one output variable depending on which the technical system is operating. The method includes providing training data that are determined with a scenario other than a real operation of the technical system, the training data are defined for data points determined from the input variables, capturing operational data points determined from the input variables in real-world operation of the technical system, and splitting the training data into training data points and validation data points. The method further includes determining a k-Nearest Neighbor tree from the training data points, and determining a first distribution of distance values of distances between each of the validation data points and a predetermined number of next training data points of the training data points.

10 Claims, 2 Drawing Sheets

(56) References Cited

OTHER PUBLICATIONS

Peter et al., "Fault Detection Using the k-Nearest Neighbor Rule for Semiconductor Manufacturing Processes," IEEE Transactions on Semiconductor Manufacturing, Nov. 2007, pp. 345-354, vol. 20, No. 4 (10 pages).
Tian et al., "Anomaly Detection Using Self-Organizing Maps-Based K-Nearest Neighbor Algorithm," European Conference of the Prognostics and Health Management Society, 2014, pp. 1-9, vol. 2, No. 1 (9 pages).
Boussaa et al., "A Novelty Search Approach for Automatic Test Data Generation," ACM 8th International Workshop on Search-Based Software Testing, IEEE, 2015, pp. 40-43 (4 pages).
Breck et al., "Data Validation for Machine Learning," Proceedings of the 2nd SysML Conference, 2019 (14 pages).

* cited by examiner

METHOD AND APPARATUS FOR PROVIDING A DATA-BASED SYSTEM MODEL AND FOR CHECKING A TRAINING STATE OF THE SYSTEM MODEL

This application claims priority under 35 U.S.C. § 119 to patent application no. DE 10 2022 200 285.7, filed on Jan. 13, 2022 in Germany, the disclosure of which is incorporated herein by reference in its entirety.

The disclosure relates to data-based system models that are trained to evaluate, control, and monitor a technical system and evaluate sensor and/or state variables of the technical system. The disclosure further relates to methods of providing a system model and evaluating the training state.

BACKGROUND

Technical systems are typically configured with a sensor assembly having one or more sensors, as well as an actuator assembly having one or more actuators. Using a controller in which a system model is implemented to realize a desired function, the sensor and state variables of the technical system are processed to execute a corresponding actuation of the actuator assembly to accomplish a task or the purpose of the technical system.

More specifically, system models are designed with or from data-based system models, as they can typically be modeled without detailed knowledge of system behavior based only on training data. This only requires training data sets that combine the sensor and state variables in a suitable defined manner into input data and associate them with a label, in particular one or more drive variables for one or more actuators of the actuator arrangement.

Since, due to limited observability and non-existent sensors, the determination of training data sets in the use of the technical system in field operation is often only possible with great effort; a measurement of the technical system is often carried out on a test bench or simulations are carried out on the system behavior. This will provide training records that will then be used to train the data-based system model in an easier manner.

SUMMARY

According to the disclosure, there is provided a method for providing a data-based system model as well as a corresponding device.

According to a first aspect, a method for providing training data is provided for training a data-based system model that can be used to operate a technical system by defining a data point determined from input variables for determining at least one output variable depending on which the technical system is operating, with the following steps:

- providing training data that are determined with a scenario other than a real operation of the technical system, wherein the training data is defined for data points determined from the input variables;
- capturing operational data points determined from the input variables in real-world operation of the technical system;
- splitting the training data into training data points and validation data points;
- determining a k-Nearest Neighbor tree from the training data points;
- determining a first distribution of distance values of distances between each of the validation data points and a predetermined number of next training data points;
- determining a second distribution of distance values of distances between each of the operational data points and the predetermined number of next training data points;
- determining a distance dimension between the first and the second distribution of the distance values; and
- adding further training data to the training data depending on the distance dimension.

The above method assumes that training data for training a data-based system model is first determined in a scenario deviating from the actual field of application, such as on a test bench or by simulation. This makes it possible to provide training data with significantly less effort than is the case by field measurement.

The data-based system model may be shaped in the form of a non-parametric model, such as a deep neural network, a cast process model, or the like, that maps an input data point formed by a combination of values of input variables to one or more output variables.

The input variables may comprise at least one model-based and/or sensorially captured operational variable of the technical system and/or at least one characteristic variable determined as an aggregate variable of a time series of the at least one operational variable or as a statistical variable with respect to the at least one operational variable.

However, in order to use the training data to train a data-based system model, it is necessary that the operating states occurring in real-world operation are thereby depicted as accurately as possible. That is, a data-based system model trained using training data resulting from the deviating scenario must output a reliable model output regarding the operating point to be evaluated.

The training data may include labelled data points, wherein the data points are characterized by a combination of one or more operational variables and/or one or more state variables and/or one or more resulting feature variables, in particular aggregated or statistical variables using a feature extraction.

Although attempts are made to completely map the operating points of the technical system measured by test bench measurement or simulation as much as possible, cases may occur—unknowingly or due to a deficiency of the test stand or an omitted factor—in which the training data resulting from the scenario deviating from the real-world scenario of a test bench measurement or simulation deviate from real-world operating points. This is problematic because a system model trained therewith provides model outputs with only reduced reliability (confidence). Generally, the operating points to be evaluated or the training data points of the training data have a number of sensor and state variables that at least partially correlate with one another so that not all combinations of operating variables and state variables actually correspond to operating points that occur under real conditions.

In order to check training data obtained, e.g., on the test bench or by simulation, for suitability for the training of a data-based system model, corresponding operational data points are determined from a real operation of the technical system and are used to check the training data points of the training data.

Thus, the training data points can be compared to the operational data points in real-world operation to determine how suitable the training data is for mapping real situations of the technical system.

To do this, the training data is first split into a training amount with training records and a validation amount with validation records. The splitting is typically randomly selected so that the selected validation datasets are selected as equally as possible from the amount of the datasets of the training data.

A distance value is now determined as a measure of deviation between the training records and the validation records. The distance value is determined based on a usage of a k-Nearest Neighbor tree of the training records. A Euclidean distance may be determined as the distance between two data points at a time.

The k-Nearest Neighbor tree is used to determine a predetermined number of N nearest data points from the training data sets for each of the validation data points of the validation data sets. There are distance values between each of the validation data points and the nearest training data points. The distance values have a corresponding first distribution.

Furthermore, the k-Nearest Neighbor tree is used to determine a predetermined number of N nearest data points from the training data sets for each of the operational data points of the operating data sets. Distance values result between each of the operational data points and the nearest training data points. The distance values have a corresponding second distribution.

The number N may be determined using the validation data set as the optimal value to show a function of the k-Nearest Neighbor: X->Y. The function may be determined by majority vote, as median or mean of the functional values of the neighbors closest to the N. Since the comparison of the distributions is based on the same statistics, it makes sense to select the number N identically for both distributions.

The first and the second distributions of the respective resulting distance values between validation data points or operational data points and corresponding training data points. These distributions may be normalized and a distance dimension may be determined as the distance or difference between the considered distributions, respectively. For this purpose, the histograms of the distance values with respect to the validation data points and the operational data points can be determined and then an Earth Moving Distance can be calculated as the distance dimension. Alternatively, the Kullback-Leibler divergence of the first and second distributions may be determined as a distance dimension. Alternative metrics for determining the distance dimension between the two distributions may also be used.

Depending on the distance dimension, it can now be decided whether the provided training data sets sufficiently map real operating cases. If the distance dimension is too high, it may be provided accordingly to increase the training amount data and determine measurements on the test bench or simulations in other operating ranges of training data points. The method is based on creating a k-Nearest Neighbor tree as an adequate data model for the training amount of the training records.

It may be contemplated that distance dimensions are determined for sub-areas of the entire data space of the data points of the training data and the operational data points, wherein further training data is determined depending on a distance dimension for the sub-area, in particular, training data being determined when the distance dimension exceeds a predetermined threshold.

If, for example, in the first pass of the above method, too high a distance dimension is determined, the method can be repeated by partitioning the data space of the data points by reducing the ranges of values of one or more input values and determining corresponding distance dimensions according to the above method. By this, successive operating ranges may be identified within the multi-dimensional data point space where there is an increased distance dimension (higher than a predetermined threshold). Thus, as additional information for generating further training data sets, a range of data points may be selected by ranges of values of the combination of one or more operational variables, one or more state variables and/or one or more feature variables characterizing the data point. In the selected sub-area of the data room, further training data can now be collected or generated in an appropriate manner, e.g. by augmentation, synthesis or further test bench measurements with new varying training data sets.

In particular, after the addition of training data, a re-determination of the distance dimension in the relevant operating range may be made. If the distance dimension is found to have improved compared to previously, the new training amount data may be taken over; on the other hand, it may be discarded.

Further, the method may be repeated in multiple replicates for as long as until the distance dimension falls below a predetermined threshold and/or a change in the distance dimension between successive repeats falls below a predetermined change threshold, wherein the replicates represent the steps of determining the second distribution, of determining the distance dimension between the first and second distributions and adding further training data to the training data that depends on the distance dimension.

BRIEF DESCRIPTION OF THE DRAWINGS

Embodiments are explained in more detail in the following with reference to the accompanying drawings. Here.

DETAILED DESCRIPTION

In the following, the training of a data-based system model will be described in more detail using a block diagram of FIG. 1 and a flowchart of FIG. 2.

Figure 1:
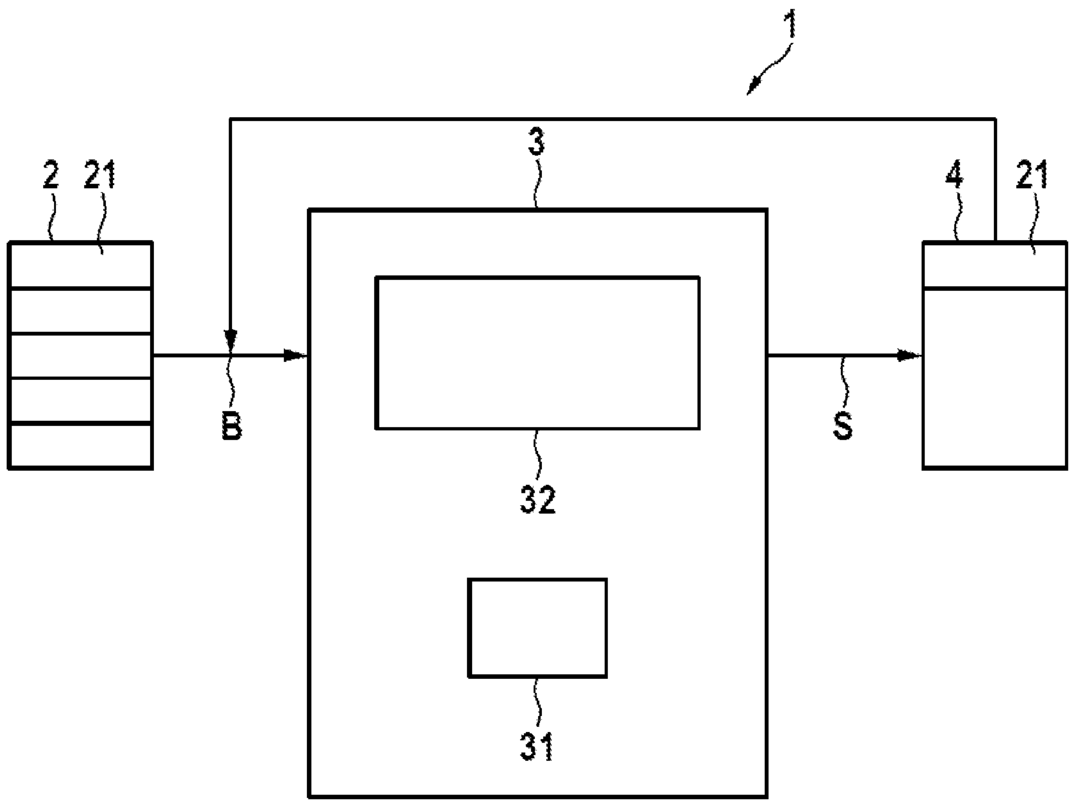
FIG. 1 shows a schematic illustration of a technical system having a data-based system model.

FIG. 1 shows a technical system 1 having a sensor assembly 2 with one or more sensors 21 configured to record and/or capture continuous measurement signals and to provide sensor variables. The sensor variables correspond to the scanned measurement signals and are provided in a control unit 3.

The control unit 3 generates one or more driving variables S for controlling one or more actuators 4. These may comprise a drive motor, an actuator, a heating system, a radiation source, and the like.

The sensors 21 can generally capture physical operational variables of the system 1 or also directly physical states of one or more actuators 4. For example, sensors 21 may include a pressure sensor, an RPM sensor, a mass flow sensor, a temperature sensor, an accelerometer, a vibration sensor, a radiation sensor, or the like.

The controller 3 includes a microprocessor 31 and a data-based system model 32 implemented separately or as a software algorithm in the microprocessor. The control unit 3 receives one or more sensor variables B as operational variables and/or state variables and determines one or more driving variables S directly, or indirectly determines a size with which one or more driving variables S are determined.

The data-based system model 32 is a non-parametric model and represents a mapping function that provides, from one or more of the operational and/or state variables and optionally one or more feature variables as input variables, one or more output variables corresponding to one or more drive variables or corresponding variables from which one or more drive variables can be derived.

For example, the feature variables may correspond to aggregated variables or statistical variables from time series of the sensor variables.

For example, the data-based system model 32 may be trained to perform a regulation or a control of one or more actuators 4.

Figure 2:
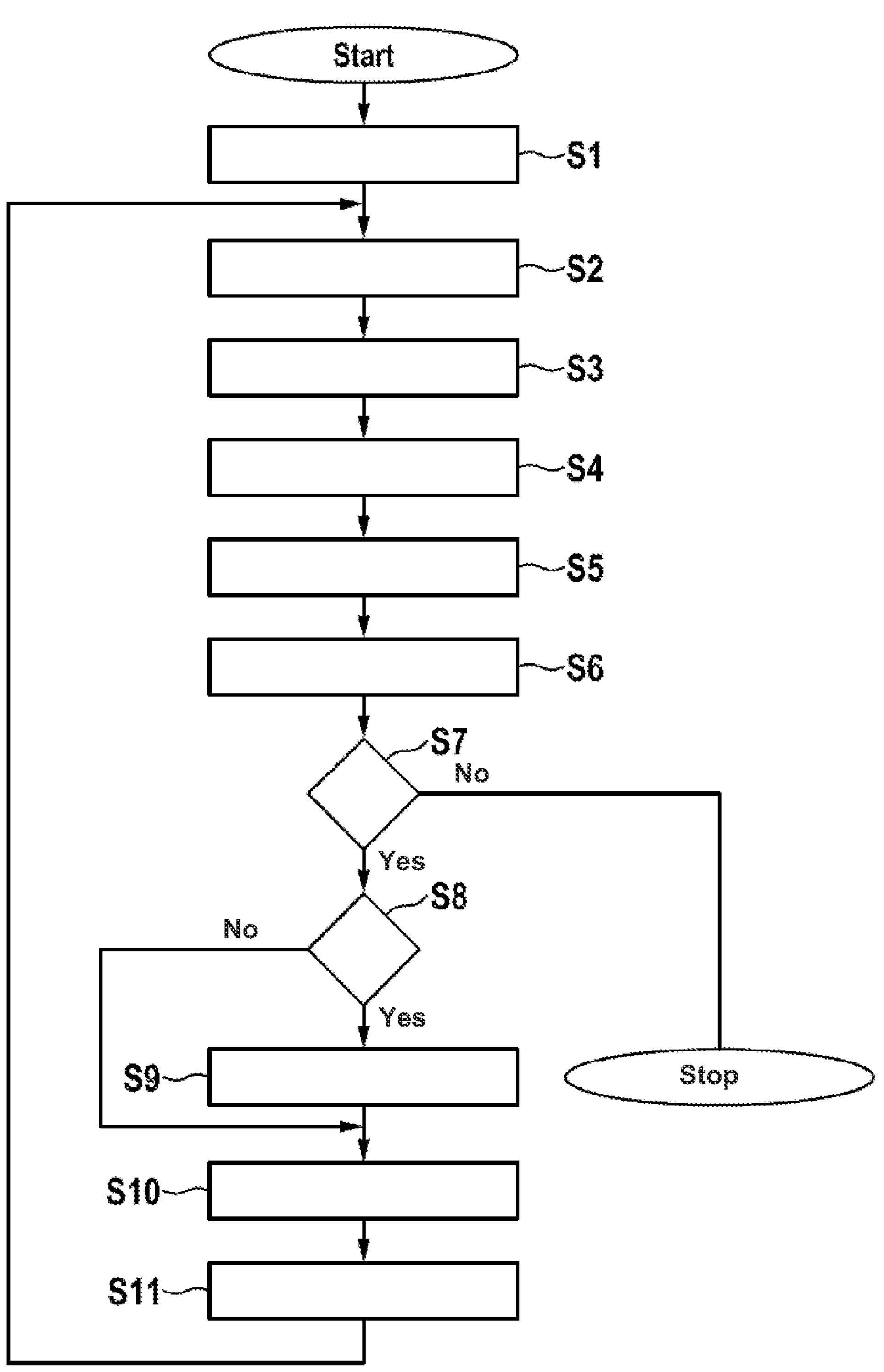
FIG. 2 shows a flowchart illustrating a method of providing a trained data-based system model for use in the technical system of FIG. 1.

In the flowchart of FIG. 2, a method for training a data-based system model is described in more detail below.

In step S1, training data for training the system model are first determined in a scenario deviating from a real operation, e.g. on a test bench and/or via simulation. The training data is formed from data sets that map input variables, such as operational, state, and/or feature variables, to one or more output variables needed to operate one or more actuators 4 of the technical system of FIG. 1, as described above. The output variables may be used for monitoring or for regulating or controlling the technical system.

The operational and state variables represent a model-based or sensorially detectable state of the technical system 1 and/or at least one characteristic of the technical system 1. The operational and state variables may at least partially correlate with one another so that the state space for the data points in which the technical system 1 is operated may be inhomogeneous.

In step S2, after a sufficient training amount data has been collected or determined, it is divided into an training amount with training data points and a validation amount with validation data points.

In step S3, operational data points corresponding to real combinations of values of the operational and state variables are acquired from a field operation of the technical system 1.

In step S4, a k-Nearest Neighbor tree or graph is generated from the training records.

This k-Nearest Neighbor tree in step S5 now allows for, in a simple manner, for each validation data point of the validation amount, the determination of a number of N nearest neighbors from the training data points of the training amount along with corresponding distance values, which have been determined in particular in the form of a Euclidean distance or with another distance metric. The distance values form a first distribution.

In a subsequent step S5, a number of N nearest neighbors are now also determined from the training data points of the training amount along with corresponding distance values for each operational data point, which have been determined in particular in the form of a Euclidean distance or with another distance metric, using the k-Nearest-Neighbor tree. These distance values form a second distribution.

For the validation points and the operational data points, distance values are now obtained to a number N nearest neighbors of the training data points from the training amount. This results in distributions of the distance values, which can be compared with one another in step S6 in order to determine a distance dimension. The distance dimension represents a measure that indicates to what extent the two distributions of the distance values are not congruent. For example, the distance dimension may be indicated as an earth moving distance or as a KL divergence of the distributions.

In a subsequent step S7, the distance dimension determined in this way can be checked against a threshold value. If the distance value is determined to exceed the threshold (alternative: yes), then the method is continued with step S8, otherwise (alternative: no) the method may be ended and the investigated training data may be used to train the data-based system model. Training is done in a known manner using a gradient based training process.

In step S8, it is checked whether the distance dimension has increased with several iterations due to the last added training data. If yes (alternative: yes), the most recently added training data will be discarded in step S9 and removed from the training data again. If the distance dimension is found to decrease, the method proceeds to step S10.

In step S10, further training data is determined for further data points by augmentation, by synthesis, new test bench measurements or simulations. The further training data is now added to the original training records in step S11 and the method is performed again by returning to step S2.

By purposefully generating the further training data, the performance of the data-based system model can be retrained in poorly depicted areas. For this purpose, the data space of the input variables can be sub-partitioned. The above method is then performed separately for multiple sub-areas of the data space, wherein only those data points within the sub-area are considered in both the training data and the operating points.

Thus, if a distance dimension above a predetermined threshold is determined for a sub-area of the data space, then further training data in the relevant sub-area can be purposefully supplemented in order to improve the performance of a system model trained with the training data.

For example, the training data may be selected for a range selection of one or more input variables and the method can be performed separately for the resulting sub-areas of the data room. The sub-area of the data space in which the training data does not optimally represent the operational data points occurring in real-world operation is located there where a higher distance dimension is obtained. Additional training data sets can now be generated in this corresponding sub-area of the training data sets, in particular by augmentation, synthesis, new test bench measurements and/or new simulations.

What is claimed is:

1. A method for training a data-based system model for operating a technical system, the data-based system model being configured to (i) receive a data point that is determined from input variables and (ii) determine at least one output variable that is used to operate the technical system, the method comprising:

providing training data that are determined with a scenario other than a real operation of the technical system, the training data being defined for data points determined from the input variables;

capturing operational data points determined from the input variables in real-world operation of the technical system;

splitting the training data into training data points and validation data points;

determining a k-Nearest Neighbor tree from the training data points;

determining a first distribution of first distance values of first distances between each of the validation data points and a predetermined number of next training data points of the training data points;

determining a second distribution of second distance values of second distances between each of the operational data points and the predetermined number of next training data points;

determining a distance dimension between the first distribution of the first distance values and the second distribution of the second distance values;

adding further training data to the training data depending on the distance dimension; and training the data-based system model, using the training data, to operate the technical system.

2. The method according to claim 1, wherein the further training data is determined by augmentation, synthesis, bench measurements, or simulations.

3. The method according to claim 1, wherein Euclidean distances are determined as (i) the first distances between each of the validation data points and the predetermined number of next training data points, and/or (ii) the second distances between each of the operational data points and the predetermined number of next training data points.

4. The method according to claim 1, wherein the input variables comprise (i) at least one model-based and/or sensorially captured operational variable of the technical system and/or (ii) at least one characteristic variable determined as an aggregate variable of a time series of the at least one operational variable or as a statistical variable with respect to the at least one operational variable.

5. The method according to claim 1, wherein:

additional distance dimensions are determined for sub-areas of an entire data space of the data points of the training data and the operational data points, the further training data is determined depending on the additional distance dimensions for the sub-areas, and the training data is determined when at least one of the additional distance dimensions exceed a predetermined threshold.

6. The method according to claim 1, wherein:

the method is repeated in multiple replicates until the distance dimension falls below a predetermined threshold and/or a change in the distance dimension between successive repeats of the method falls below a predetermined change threshold, and the multiple replicates include determining the second distribution, determining the distance dimension between the first distribution and the second distribution, and adding further training data to the training data that depends on the distance dimension.

7. The method according to claim 1, wherein the data-based system model is a non-parametric model.

8. The method according to claim 7, wherein the data-based system model is a neural network.

9. A device comprising:

a processor configured to carry out the method according to claim 1.

10. A non-transitory machine-readable storage medium comprising instructions which, when executed by a computer, cause the computer to execute the method according to claim 1.

* * * * *